(12) United States Patent
Mannaluru et al.

(10) Patent No.: US 10,009,258 B2
(45) Date of Patent: Jun. 26, 2018

(54) METHODS, SYSTEMS, AND COMPUTER READABLE MEDIA FOR ROUTING A REDIRECTED REQUEST MESSAGE

(71) Applicant: Oracle International Corporation, Redwood Shores, CA (US)

(72) Inventors: Krishna Mannaluru, Apex, NC (US); Jonathan James Palmer, Durham, NC (US); Mark Edward Kanode, Apex, NC (US); Salim Khodri, Franconville (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 275 days.

(21) Appl. No.: 15/084,444

(22) Filed: Mar. 29, 2016

(65) Prior Publication Data

US 2017/0289017 A1    Oct. 5, 2017

(51) Int. Cl.
*G06F 15/16* (2006.01)
*H04L 12/707* (2013.01)
(Continued)

(52) U.S. Cl.
CPC .......... *H04L 45/22* (2013.01); *H04L 63/0892* (2013.01); *H04L 67/2814* (2013.01); *H04W 12/06* (2013.01)

(58) Field of Classification Search
CPC . H04L 45/22; H04L 63/0892; H04L 67/2814; H04W 12/06
See application file for complete search history.

(56) References Cited

U.S. PATENT DOCUMENTS 5,228,083 A   7/1993  Lozowick et al.
6,304,273 B1  10/2001  Bonnet
(Continued)

FOREIGN PATENT DOCUMENTS

CN   101136943 A    3/2008
EP   2 534 796 A2   12/2012
(Continued)

OTHER PUBLICATIONS

"Oracle Communications Diameter Signaling Router Main Differentiators: Building Bullet-proof Signaling Networks," Oracle White Paper, Oracle Communications, p. 1-6 (Feb. 2016).
(Continued)

*Primary Examiner* — Moustafa M Meky
(74) *Attorney, Agent, or Firm* — Jenkins, Wilson, Taylor & Hunt, P.A.

(57) ABSTRACT

A method for routing a redirected request message is disclosed. The method may be implemented in a Diameter signaling router (DSR) including a plurality of message processors. The method includes applying ingress message processing to a Diameter request message received from a peer node and forwarding the Diameter request message to a Diameter redirect agent in accordance to the ingress message processing. The method further includes receiving, from the Diameter redirect agent, a redirection notification message containing redirection information and modifying the Diameter request message to include the redirection information. The method also includes applying the ingress message processing to the modified Diameter request message within the DSR.

20 Claims, 4 Drawing Sheets

(51) Int. Cl.
*H04L 29/08* (2006.01)
*H04L 29/06* (2006.01)
*H04W 12/06* (2009.01)

(56) References Cited

U.S. PATENT DOCUMENTS

| | | | |
|---|---|---|---|
| 6,584,073 | B1 | 6/2003 | Steele, Jr. et al. |
| 6,954,790 | B2 | 10/2005 | Forslöw |
| 7,136,635 | B1 | 11/2006 | Bharatia et al. |
| 7,292,592 | B2* | 11/2007 | Rune .................. H04L 45/34 370/328 |
| 7,894,353 | B2 | 2/2011 | Li et al. |
| 8,041,021 | B2 | 10/2011 | Xu et al. |
| 8,483,233 | B2 | 7/2013 | Craig et al. |
| 8,613,073 | B2* | 12/2013 | McCann ............. H04L 63/0263 726/11 |
| 8,825,060 | B2* | 9/2014 | McCann ................ H04L 45/64 370/389 |
| 8,958,306 | B2* | 2/2015 | McCann ............. H04L 63/0263 370/241 |
| 9,118,598 | B2* | 8/2015 | Li ........................ H04L 45/00 |
| 9,647,986 | B2* | 5/2017 | McCann ............. H04L 63/0227 |
| 2002/0069278 | A1 | 6/2002 | Forslow |
| 2002/0087723 | A1 | 7/2002 | Williams et al. |
| 2002/0181507 | A1 | 12/2002 | Jones |
| 2006/0077926 | A1* | 4/2006 | Rune .................. H04L 45/34 370/328 |
| 2006/0101159 | A1 | 5/2006 | Yeh et al. |
| 2007/0047539 | A1 | 3/2007 | Agarwal et al. |
| 2008/0025230 | A1 | 1/2008 | Patel et al. |
| 2009/0080440 | A1 | 3/2009 | Balyan et al. |
| 2009/0185494 | A1* | 7/2009 | Li ........................ H04L 45/00 370/241 |
| 2010/0265948 | A1 | 10/2010 | Patel et al. |
| 2011/0126277 | A1* | 5/2011 | McCann ............. H04L 63/0263 726/13 |
| 2014/0181952 | A1* | 6/2014 | McCann ............. H04L 63/0263 726/13 |
| 2014/0226495 | A1* | 8/2014 | Kanode ............... H04L 63/0892 370/244 |
| 2015/0215167 | A1* | 7/2015 | Donovan ............ H04L 63/0892 709/223 |

FOREIGN PATENT DOCUMENTS

| WO | WO 2009/070179 A1 | 6/2009 |
|---|---|---|
| WO | WO 2011/100610 A2 | 8/2011 |

OTHER PUBLICATIONS

Extended European Search Report for European Patent Application No. 11742912.6 (dated Jun. 26, 2015).

Second Office Action for Chinese Patent Application No. 201180018670.0 (dated May 25, 2015).

"Oracle Communications Diameter Signaling Router," Oracle Communications LTE Diameter Signaling Index 4th edition:Forecast Report and Analysis 2014-2019. Oracle Data Sheet, p. 1-4 (2014).

First Office Action for Chinese Patent Application No. 201180018670.0 (dated Jul. 14, 2014).

Taou et al., "Realm-Based Redirection in Diameter," RFC 7075, p. 1-10 (Nov. 2013).

Interview Summary for U.S. Appl. No. 13/026,098 (dated May 23, 2013).

Notice of Allowance and Fee(s) Due for U.S. Appl. No. 13/026,098 (dated Mar. 11 2013).

Communication of European Publication Number and Information on the Application of Article 67(3) EPC for European Patent Application No. 11742912.6 (dated Nov. 21, 2012).

Fajardo et al., "Diameter Base Protocol," Internet Engineering Task Force (IETF), RFC 6733, pp. 1-152 (Oct. 2012).

Non-Final Official Action for U.S. Appl. No. 13/026,098 (dated Sep. 20, 2012).

Notification of Transmittal of the International Search Report and the Written Opinion of the International Searching Authority, or the Declaration for International Application No. PCT/US2011/024622 (dated Oct. 31, 2011).

Tsou et al., "Realm-Based Redirection in Diameter," Internet Engineering Task Force, draft-ietf-dime-realm-based-redirect-02, pp. 1-7 (Oct. 27, 2009).

Liu et al., "Introduction to Diameter," IBM Technical Library, http://www.ibm.com/developerworks/wireless/library/wi-diameter/, pp. 1-9 (Jan. 24, 2006).

* cited by examiner

METHODS, SYSTEMS, AND COMPUTER READABLE MEDIA FOR ROUTING A REDIRECTED REQUEST MESSAGE

TECHNICAL FIELD

The subject matter described herein relates to processing redirection notification messages in networks that utilize the Diameter protocol. More particularly, the subject matter described herein relates to methods, systems and computer readable media for routing a redirected request message.

BACKGROUND

While processing an incoming Diameter request message (e.g., a Diameter Update message), a redirect agent network element (e.g., a subscriber location function) in a Diameter protocol network may send a redirection notification message to a redirect client (e.g., a Diameter signaling router) in the event the redirect agent does not contain information pertaining to a mobile subscriber identifier indicated in the Diameter request message. Typically, the redirection notification message directed to the redirect client contains attribute value pair (AVP) data that includes information pertaining to a network element (e.g., a home subscriber server) that supports the identified mobile subscriber. Notably, such information may be used by the redirect client to send the redirected request to the redirect host. In particular, Diameter protocol standards detail the manner in which a redirect client should process a redirection notification message and subsequently forward the redirected request directly to the indicated redirect host indicated by the redirection notification message without any further application processing conducted by the redirect client.

Accordingly, there exists a need for methods, systems, and computer readable media for routing a redirected request message.

SUMMARY

A method for routing a redirected request message is disclosed. The method may be implemented in a network node including a plurality of message processors. The method includes applying ingress message processing to a Diameter request message received from a peer node and forwarding the Diameter request message to a Diameter redirect agent in accordance to the ingress message processing. The method further includes receiving, from the Diameter redirect agent, a redirection notification message containing redirection information and modifying the Diameter request message to include the redirection information. The method also includes applying ingress message processing to the modified Diameter request message within a Diameter signaling router (DSR).

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for routing a redirected request message. Notably, the disclosed subject matter details a procedure in which the original Diameter request message is first modified using information contained in a redirection notification message. As used herein, redirection notification is a mechanism utilized by a redirect agent, such as a subscriber location function (SLF), that has determined a Diameter request message cannot be satisfied locally by the redirect agent. The DSR that sent the Diameter request message utilizes redirection information (e.g., Redirect-Host information, Redirect-Realm information, and/or other AVPs) contained within a redirection notification message to send a redirect request to a new destination (e.g., the redirect host server). For example, the redirection notification message may contain one or more redirect attribute value pairs (AVPs) that indicate the network address and/or location of the redirect host, such as a redirect-host AVP or a redirect-realm AVP.

After receiving the AVP data included in the redirection notification message, a redirection manager in the DSR may subsequently modify the original Diameter request message and subsequently resubmit it to the Diameter application layer (DAL) of the DSR for ingress message processing by one or more of the local applications (e.g., subjected to a set of application and peer routing rules) in an attempt to determine and/or confirm a new destination for the redirected request message. Notably, the new destination for sending the redirected request message based on the rules (typically only available to newly received ingress Diameter request messages) may be determined as opposed to solely relying on information or AVP data included in the redirection notification message provided by a non-local redirect agent. The disclosed subject matter affords more flexibility and control with respect to how identification information received in a redirection notification message is processed and a redirected request message is subsequently routed. As an example, a redirection notification message may be identified by the redirection manager in the DSR, and subsequently subjected to routing rules and/or ingress message processing that is usually applied to original Diameter request messages received by the DSR. More specifically, the disclosed subject matter may enable a DSR to modify the original Diameter request message by inserting identification information contained in a received redirection notification message into the original Diameter request message. The DSR may then be configured to subsequently process the modified Diameter request message using one or more of the local applications residing in the Diameter application layer (DAL) of the DSR.

Figure 1:
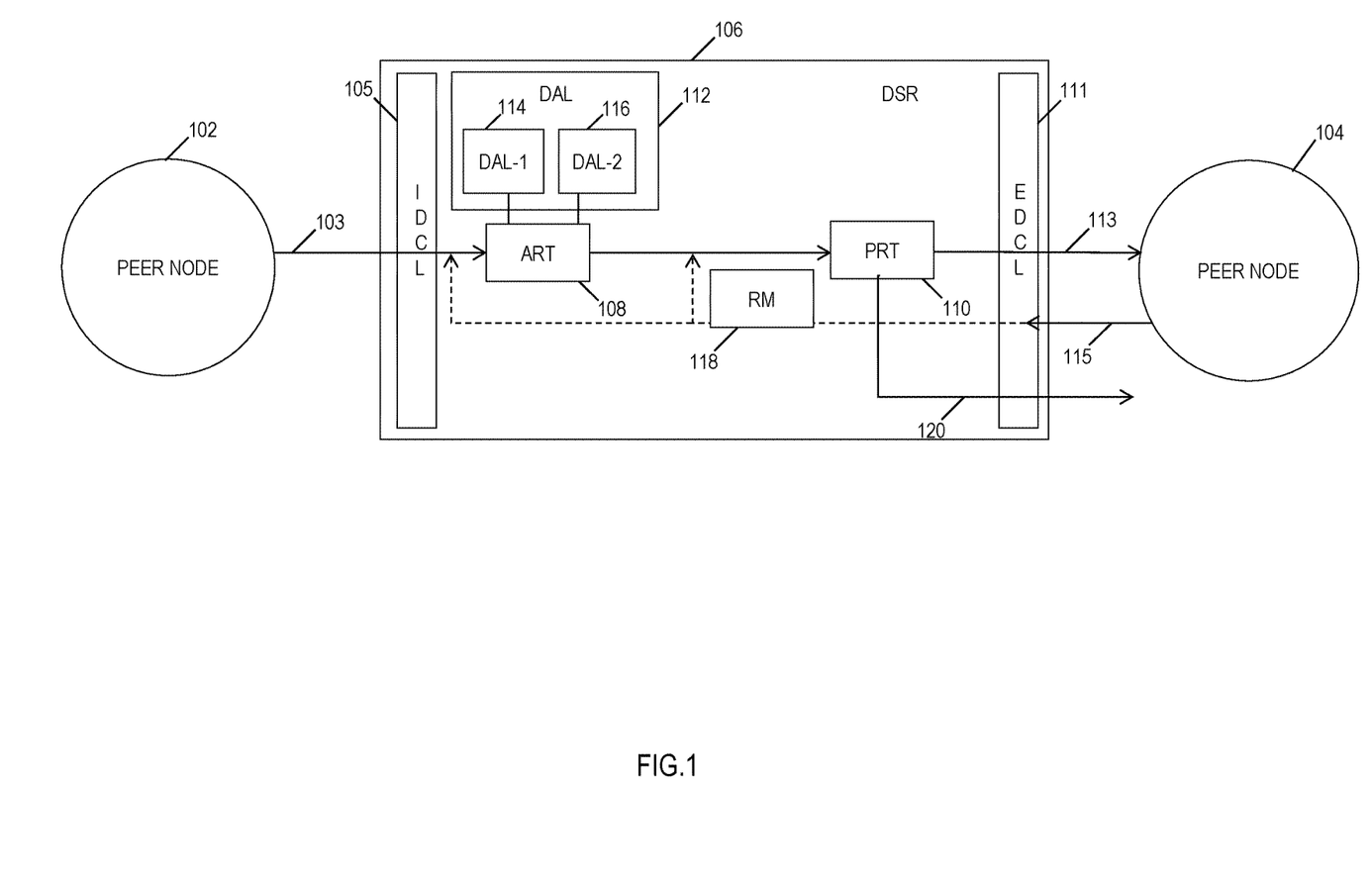
FIG. 1 is a block diagram illustrating an exemplary Diameter signaling router according to an aspect of the subject matter described herein.

FIG. 1 is a network diagram illustrating exemplary applications for routing a redirected request message according to an aspect of the subject matter described herein. Referring to FIG. 1, a network node, such as a DSR 106 may implement a redirected request message routing functionality. DSR 106 may interface with an ingress peer node 102 and an egress peer node 104. In some embodiments, egress peer node 104 may serve as a Diameter redirect agent, such as a subscriber location function (SLF). In some embodiments, ingress peer node 102 may include a Diameter network element (e.g., a serving call state control function (S-CSCF) or a mobility management entity (MME)) that is configured to send or forward Diameter request messages, such as an update location request (ULR) message or a location information request message. In one example, ingress peer node 102 may comprise an S-CSCF that is configured to send a location information request message 103 to DSR 106. In another example, ingress peer node 102 may comprise an MME that sends a ULR message to DSR 106. Notably, a message processor residing in ingress Diameter connection layer (DCL) 105 receives and forwards the received request message to an application routing table (ART) 108 residing in the Diameter application layer (DAL) of DSR 106. As used herein, an ART may include a route table that contains one or more application routing rules that can be used for routing request messages to DSR applications. In some embodiments, a message processor in the Diameter routing layer (DRL) may utilize ART 108 to inspect Diameter request message 103 and access identification data (e.g., public identifier, mobile subscriber identifier, IMSI, etc.) contained in the Diameter request message. Notably, ART 108 (and executing message processor) may use the extracted identification data to determine (e.g., find an ART database entry that matches the identification data) whether request message 103 is to be subjected to any ingress message processing conducted by the DAL applications 114-116 supported by DSR 106. Exemplary ingress message processing may include at least one of range based address resolution (RBAR), full address-based resolution (FABR), protocol mediation, mobile subscriber authentication, and the like. For example, address resolution is the process by which a non-routable address, such as an IMSI, MSISDN number, or subscriber IP address in a message is used to determine a destination for the Diameter request message. Diameter agent address resolution can be range based, where the IMSI or MSISDN number in a message is compared to ranges of IMSIs or MSISDNs for a destination, or full subscriber address based, where the IMSIs or MSISDNs extracted from a message are compared to a full subscriber address corresponding to a destination. Although only two DAL applications are depicted in FIG. 1, additional applications may reside in DAL 112 without departing from the scope of the disclosed subject matter. In some embodiments, each of DALs 114-116 may represent a RBAR application, a FABR application, and/or a protocol mediation application.

As an example, the DRL may perform a lookup in ART 108 to identify applications required for the received message. Table 1 shown below illustrates exemplary entries that may be included in the application routing table. Each entry in the application routing table maps a message type to an application within DSR 106. For example the ART entry may indicate that a Diameter request message is mapped to the address resolution application. Other applications and message types may be included in the application routing table without departing from the scope of the subject matter described herein. Once address resolution is performed, the Diameter request message is modified based on results of the address resolution, and the message is returned to the Diameter routing layer. As stated above, performing address resolution may include mapping an IMSI or MSISDN in a message to a routable address or a network node. The address resolution may be range based or full subscriber address based. Table 1 shown below illustrates an example of address resolution table entries.

TABLE 1

Address Resolution Table

| IMSI or MSISDN | Routable Address |
|---|---|
| IMSI1 | HLR1 |
| IMSI2-IMSI9999 | HLR2 |
| MSISDN1-MSISDN9999 | AAA1 |
| MSISDN100 | AAA2 |

In Table 1, the left-hand column includes individual subscriber identifiers and ranges of subscriber identifiers. The right-hand column includes routable addresses. The identifiers and addresses are shown symbolically for illustrative purposes, it is understood that actual addresses may include Diameter host IDs, IP addresses, or point codes for the routable addresses and actual IMSI or MSISDN numbers for the first column. In Table 1, the first entry maps IMSI1 to the routable address for HLR1. The second entry maps IMSIs 2-9999 to the routable address for HLR2. The first entry corresponds to an individual or full subscriber address resolution and the second entry corresponds to a range based address resolution. It should be noted that the first entry is outside the range of the second entry. In another example, individual entries may represent exceptions to range based entries. For example, in the fourth entry, MSISDN100, is within the range of the third entry, MSISDN1-MSISDN9999. In such a case, the full subscriber address entry represents an exception to the range based entry, and the routable address corresponding to the exception may be used to route the outbound message.

After ART 108 is used by a message processor to determine that Diameter request message 103 requires processing from an application (e.g., address resolution) residing in DAL 112, Diameter request message 103 is processed by the designated application. After being processed, the request message is sent by the message processor (i.e., as egress request message 113) to peer routing table (PRT) 110 to determine the address information associated with a supporting network element, such as an HSS. As used herein, a PRT is a route table that includes a set of prioritized peer routing rules that define routing messages to peer nodes based on message content. Utilizing this address information, a Diameter request message 113 is forwarded to peer node 104 via an egress DCL 111 (which may be embodied as the same entity as IDCL 105, but is logically represented as a separate component in FIG. 1). As an example, DRL in DSR 106 may forward the outbound message to DCL 111, where a message handler encapsulates the Diameter request message in a UDP datagram. DCL 111 in turn forwards the Diameter request message to the intended Diameter peer node.

Upon receipt of Diameter request message 113, peer node 104 (e.g., an SLF) may access and utilize the mobile subscriber identification data included in Diameter request message 113 to locate network address information (e.g., in a local database) pertaining to a redirect host (not shown), such as an HSS that contains information associated with the identification data. Peer node 104 then generates and sends a redirection notification message 115 to DSR 106. In some embodiments, a redirection notification message is a Diameter based answer message that is received from peer node 104 that is functioning as a redirect agent (e.g., an SLF). In some embodiments, the redirection notification message may contain a result code 3006 or 3011 which can be used by DSR 106 and/or redirection manager 118 to identify message 115 as a redirection notification message.

In some embodiments, the redirection notification message received by the DSR may include a redirect-host AVP that has been added by the redirect agent. This type of redirection notification message is defined in RFC 6733 and may include a 3006 identifier that may be recognized/detected by the DSR. Such a redirection notification contains the fully qualified domain name (FQDN) of the redirect host, the transport protocol used by the host, and a port identifier used by the redirect host for message communications. In some embodiments, in response to receiving the redirection notification, redirection manager 118 in the DSR may replace the destination-host AVP in the original Diameter request message with the received FQDN of the redirect-host in the redirected request to be sent by the DSR. In some embodiments, more than one AVP may be present in the redirection notification message and the message type may include a "DiameterURI" format (e.g., aaa://FQDN:[port];[transport];[protocol]).

For example, an exemplary redirection notification message may include:
    aaa://host.example.com:6666; transport=tcp; protocol=diameter
    aaa://host.example.com:1813; transport=sctp In some embodiments, the redirection notification message may include a redirect-realm AVP that is added by the DSR. This type of redirection notification message is defined in RFC 7075 and may include a 3011 identifier that may be recognized/detected by the DSR. In particular, the redirection notification message may contain the realm of the redirected network and/or host. In response to receiving the redirection notification message, the DSR may modify the original Diameter request message by replacing the destination-realm AVP with the realm identifier to be included in the redirected request message to be sent by the DSR. In some embodiments, more than one AVP may be present in the received redirection notification message and the message type may include a "DiameterIdentity" format.

In addition or in lieu of the redirect-host/redirect-realm AVPs, the redirection notification message may contain other AVPs such as a Redirect-Host-Usage AVP or a Redirect-Max-Cache-Time AVP. For example, the redirection notification message may optionally include a Redirect-Host-Usage AVP that is added by the redirect agent in order to indicate how the routing entry resulting from the Redirect-Host/Redirect-Realm is to be utilized (e.g., whether to cache the Host/Realm and the scope). Likewise, the Redirect-Max-Cache-Time AVP may indicate the lifetime of a cached Redirect-Host entry. Such an AVP is optional and is useful when caching is supported by a redirect client, such as DSR 106.

In some embodiments, redirection notification message 115 is received by a message processor residing in egress DCL 111 and forwarded to redirection manager 118. Notably, redirection manager 118 does not exist in a typical DSR since redirection manager 118 performs functions that are not mentioned or suggested by the Diameter standards. Instead, redirection manager 118 may be configured to receive redirection notification message 115 and extract redirect host information contained within. Redirection manager 118 may then modify the original Diameter request message to include the extracted redirect host information and subsequently submits the modified Diameter request message to ART 108 for ingress message processing (as opposed to directly forwarding the original Diameter request message to the network element indicated by the identification information included in the redirection notification message sent by peer node 104. Notably, a message processor utilizes ART 108 to determine if the modified Diameter request message should be processed by an application in DAL 112 (e.g., in a manner similar to an originally received Diameter request message).

In some embodiments, DSR 106 may be enabled and/or configured (e.g., via user selection) to perform redirection processing. Upon DSR 106 enabling such a functionality, a redirection manager 118 residing within DSR 106 may be configured to process a Diameter answer message (e.g., a redirection notification) that includes a value of 3006 or 3011. Notably, redirection manager 118 is able to identify a received Diameter answer message as a redirection notification message if said message contains either 3006 or 3011 as an identifier. Redirection manager 118 may be configured to process a "Reroute on Answer" message first since such a message has precedence over a redirection notification message in the Diameter standard.

In the event none of the previous actions are executed, redirection manager 118 may be configured to replace the Destination-Host/Destination-Realm AVP(s) included in the egress Diameter request message with values from the Redirect-Host/Redirect-Realm AVP included in the redirection notification message. In some embodiments, a redirection manager 118 determines if the "Systems Options" indicates a "Redirect ART" setting. If set, redirection manager 118 may continue routing to ART 108 using the configured ART instance. In contrast, if the Systems Options is not set to Redirect ART, redirection manager 118 may continue by forwarding the message to PRT 110 (thereby skipping the ART processing).

If "Systems Options" indicates a "Redirect PRT" setting", then the redirect PRT obtains precedence of a Transaction Configuration Group. If not set, then redirection manager 118 may be configured to select the PRT as per standard PRT selection precedence rules. Notably, redirection manager 118 is capable of processing a modified Diameter request message (that includes identification information extracted from a received redirection notification message) as it would process an original peer initiated request message or an application initiated request message that is received by the DSR.

Once the modified Diameter request message is processed by one or more applications residing in DAL 112, the message is forwarded to PRT 110 for further routing. For example, the outbound message is then passed back to the DRL and a route lookup is performed in PRT 110. In some embodiments, PRT 110 maps the routable addresses determined in the address resolution to the outbound interface. Table 2 shown below illustrates an example of data that may be included in PRT 110.

TABLE 2

Peer Routing Table

| Routable Address | Outbound Connection |
| --- | --- |
| HLR1 | C1 |
| HLR2 | C2 |
| AAA1 | C3 |
| AAA2 | C4 |

In Table 2, the left-hand column includes routable addresses obtained from the address resolution and the right-hand column lists outbound connections. In the DSR, the outbound interfaces may be associated with connections on message processors in egress DCL 111 which are labeled C1-C4. Once the message processor is identified, the message is forwarded to the identified message processor. Further, the message is forwarded to the egress peer node via the identified message processor.

For example, using the PRT 110 in this manner, DSR 106 may process the modified Diameter request message to determine which network element the redirected request message should be forwarded. After PRT element 110 has completed the processing of the modified Diameter request message, DSR 106 may forward the modified Diameter request message as a redirected request message 120 to a message processor in egress DCL 111. From there, DSR 106 sends redirected request message 120 to redirect host indicated by destination information in the redirected request message 120.

In some embodiments, DSR 106 may communicate redirected request messages to HSSs using Diameter messaging on a Diameter SWx interface or a Diameter S6a interface. DSR 106 may also be configured to implement authentication proxying and protocol interworking. As part of performing authentication proxying and protocol interworking, DSR 106 may perform network address resolution. For example, in order to identify the correct HSS to which an outbound message should be routed, DSR 106 may utilize ART 108 and/or DAL 112 to perform an address resolution. Some network operators may provision HSSs with records for different groups of subscribers. In order to identify the HSS that contains a record for a record for a particular subscriber, DSR 106 will perform the address resolution using IMSI or MSISDN in a received Diameter request message.

After receiving a redirected request message, the redirect host (such as an HSS) uses the mobile subscriber identifier in the redirected request message to obtain the requested information and subsequently returns said information to DSR 106 via an answer message. In some embodiments, DSR 106 may be configured to process and/or route the answer message received in response to the redirected request message via the same procedure as any Diameter answer message. Notably, DSR 106 and/or redirection manager 118 may re-apply the "Answer Instruction Stack" from the original message transaction to the redirected message transaction. The Answer Instruction Stack is then used for processing the answer message received in response to the redirected request message. In some embodiments, the Answer Instruction Stack comprises a list of actions to be executed upon receipt of an Answer for a Request that is maintained by the DRL.

In some embodiments, DSR 106 may be configured to leave the Diameter request message unmodified. Specifically, DSR 106 may be configured to apply ingress message processing to the "unmodified" Diameter request message upon receiving a redirection notification message from the Diameter redirect agent. Notably, such an embodiment may be particularly beneficial in scenarios and use cases that employ simple screening, e.g., in the event the Diameter request message may be applied to a different ART and/or PRT (e.g., a redirect ART and/or redirect PRT).

Figure 2:
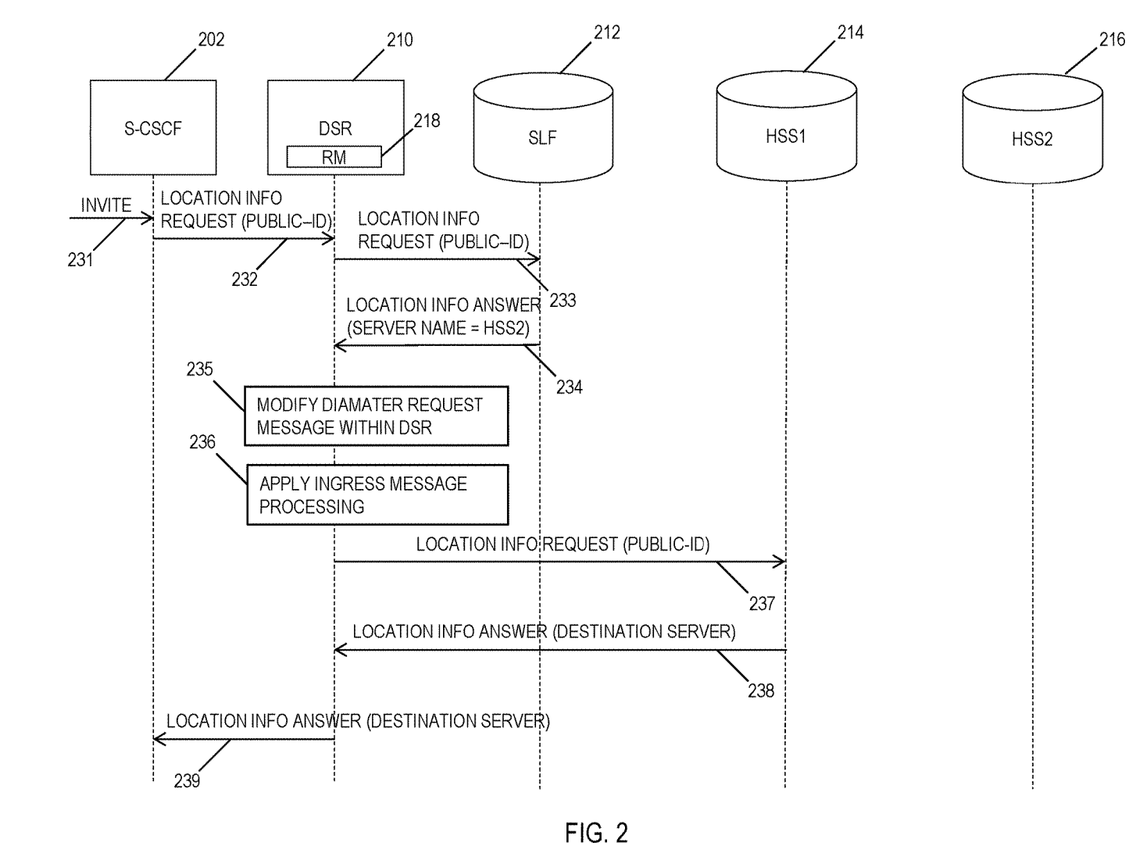
FIG. 2 is a message flow diagram illustrating exemplary network components for routing a redirected request message according to an aspect of the subject matter described herein.

FIG. 2 is a message flow diagram illustrating exemplary network components for routing a redirected request message according to an aspect of the subject matter described herein. FIG. 2 illustrates a particular use case wherein an S-CSCF 202 receives a session initiation protocol (SIP) INVITE message 231 that originates from a calling party entity (not shown). In response to receiving the SIP INVITE message 231, S-CSCF 202 generates and sends a Diameter Location Information Request (LIR) message 232 to a DSR 210, which is functioning as a proxy agent. In some embodiments, LIR message 232 includes a public identifier associated with a mobile subscriber. Upon receiving LIR message 232, DSR 210 may process LIR message 232 using one or more applications residing in the DAL of DSR 210. After processing LIR message 232 at the DAL, the resulting Diameter request message (represented as a modified LIR message 233) may be routed by DSR 210 using local PRTs. As shown in FIG. 2, Diameter request message 233 is sent to an SLF 212 that is functioning as a redirect agent element. Upon receiving LIR message 233, SLF 212 determines that it cannot satisfy the request locally (e.g., SLF 212 does not contain location information pertaining to the indicated called party) and generates a redirection notification message that includes location information (e.g., network address information) for a redirect host supporting the mobile subscriber identified by the public-ID. For example, SLF 212 may generate a location information answer (LIA) message 234 that includes the server name and network address associated with an HSS2 216.

After receiving a redirection notification message (e.g., location information answer message 234), a receiving DSR configured to comply with RFC 6733 simply sends a redirected request message to a redirect host (e.g., HSS2 216) designated in the redirection notification message. In contrast, DSR 212 may include a redirection manager 218 that is configured to receive answer message 234 (which functions as a redirection notification message) and subsequently determine that answer message 234 is a redirection notification message (e.g., by detecting 3006 or 3011 values include in the redirection notification message). After making such a determination, redirection manager 218 may extract the redirect host identification information from the redirection notification message and modify the original LIR message to include the extracted redirect host identification information within the DSR (Block 235). The modified LIR message is then resubmit by redirection manager 218 to the DAL within DSR 210. Upon receiving the modified Diameter request message from the redirection manager 218, the DAL in DSR 210 may process the modified message using one or more applications residing in the DAL (Block 236). Notably, such ingress message processing is typically reserved for Diameter request messages initially received from a requesting peer node (e.g., S-CSCF 202) by DSR 210 in accordance to Diameter standards. However, redirection manager 218 enables the further processing of identification information contained within redirection notification messages received from a redirect agent. Notably, the AVPs in answer message 234 may be modified as a result of the processing.

After answer message 234 is processed using applications residing the DAL of DSR 210, redirection manager 218 may forward the modified Diameter request message to the PRT element for routing to its destination. Instead of routing location information request 232 to HSS2 216 as previously indicated by SLF 212 (via identification information answer message 234), DSR 210 may determine via DAL processing that the proper destination should instead be HSS1 214. In such a scenario, DSR 210 may be configured to generate and send a modified location information request message 237 to HSS1 214 by inserting the location name and/or network address corresponding to HSS1 214 in the request message 237. Thus, HSS1 214 receives modified LIR message 237 instead of HSS2 216, despite the identification information provided by SLF 212. Upon receiving the modified LIR message 237, which includes the mobile subscriber public identifier, HSS1 214 may be configured to use the mobile subscriber public identifier to access its local databases to properly identify the destination server (e.g., a VSS in a visited network) currently supporting the mobile device corresponding to the mobile subscriber public identifier. HSS1 214 may then be configured to generate a location information answer message 238 that includes the network address and/or identification information corresponding to the supporting destination server. HSS1 214 subsequently sends the LIA message 238 to DSR 210, which in turn forwards the LIA message (represented as message 239) to the requesting S-CSCF 202.

Figure 3:
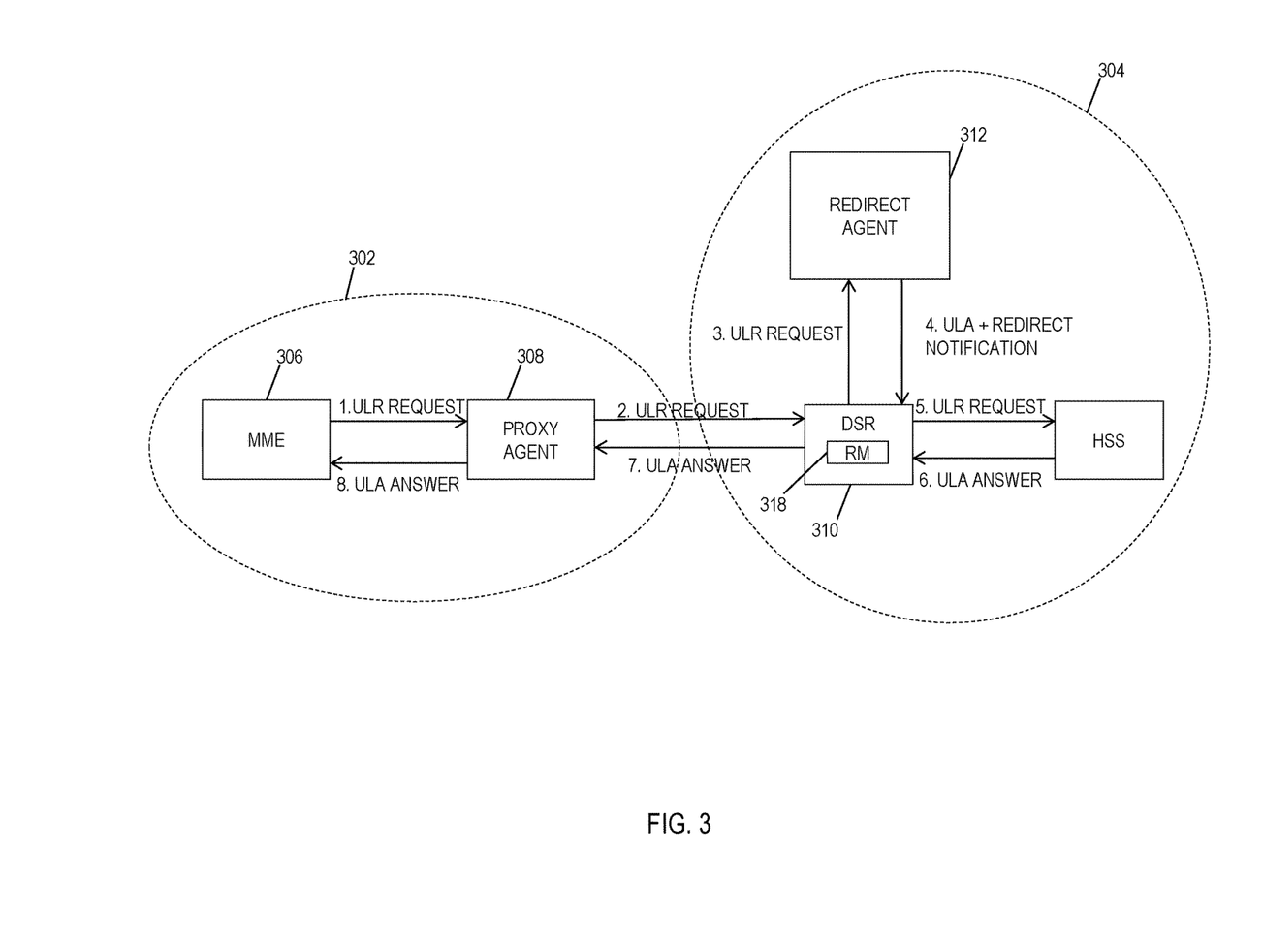
FIG. 3 is a block diagram illustrating exemplary network components for routing a redirected request message according to an aspect of the subject matter described herein.

FIG. 3 is a block diagram illustrating exemplary network components for routing a redirected request message according to an aspect of the subject matter described herein. In particular, FIG. 3 depicts a first network 302 and a second network 304. As shown in FIG. 3, first network 302 includes an MME 306 and a proxy agent element 308, while second network 304 includes a DSR 310, a Redirect Agent 312, and an HSS 314. In some embodiments, first network 302 may comprise a "first service provider network" that is in partnership with a "second service provider network" that is represented by network 304. Notably, FIG. 3 illustrates a scenario in which a redirection notification message is issued by network 304 in response to a Diameter update location request (ULR) message being sent by network 302. For example, MME 306 in network 302 may generate and send a ULR message (message 1) to a proxy agent 308, which in turn forwards the ULR message to DSR 310 residing in a different service provider network (e.g., network 304). Upon receiving the ULR message (message 2), DSR 310 may be configured to process the ULR message and determine that it should be forwarded to redirect agent 312. In some embodiments, redirect agent 312 may comprise an SLF configured to function as a roaming steering solution. Redirect agent 312 may then process the received ULR message (message 3) in order to determine whether it is supporting the mobile device corresponding to an IMSI included in the ULR message. In the event the redirect agent determines that it is not currently supporting the mobile subscriber, redirect agent 312 may generate a Diameter update location answer (ULA) message that functions as a redirection notification message. Namely, the ULA message (message 4) may contain the IMSI and the address and/or identifier of the redirect host supporting the mobile device corresponding to the IMSI. The ULA message may also include a result code of 3006, which serves as an indication ULA message is a redirection notification message. Further, as indicated above, DSR 310 may be configured to function as a proxy agent and process the original ULR using information included in the received redirection notification. In particular, a redirection element 318 in DSR 310 may extract the redirect-host information and/or AVP information contained in the ULA message (which functions as the redirection notification message) to generate a modified ULR message that is subjected to DAL processing (e.g., ingress message processing). Once DAL processing is completed, the modified ULR is inspected to determine the appropriate destination. Depending on the results of the DAL processing, HSS 314 may be identified as the appropriate redirect host. As such, DSR 310 generates and sends a redirected request (e.g., a ULR message 5) to HSS 314. HSS 314 in response generates and sends a ULA message (message 6) that includes an identifier of the HPLMN and/or HSS supporting the roaming mobile device to DSR 310. Afterwards, DSR 310 forwards the ULA message to proxy agent 308, which in turn sends the ULA message to MME 306.

Figure 4:
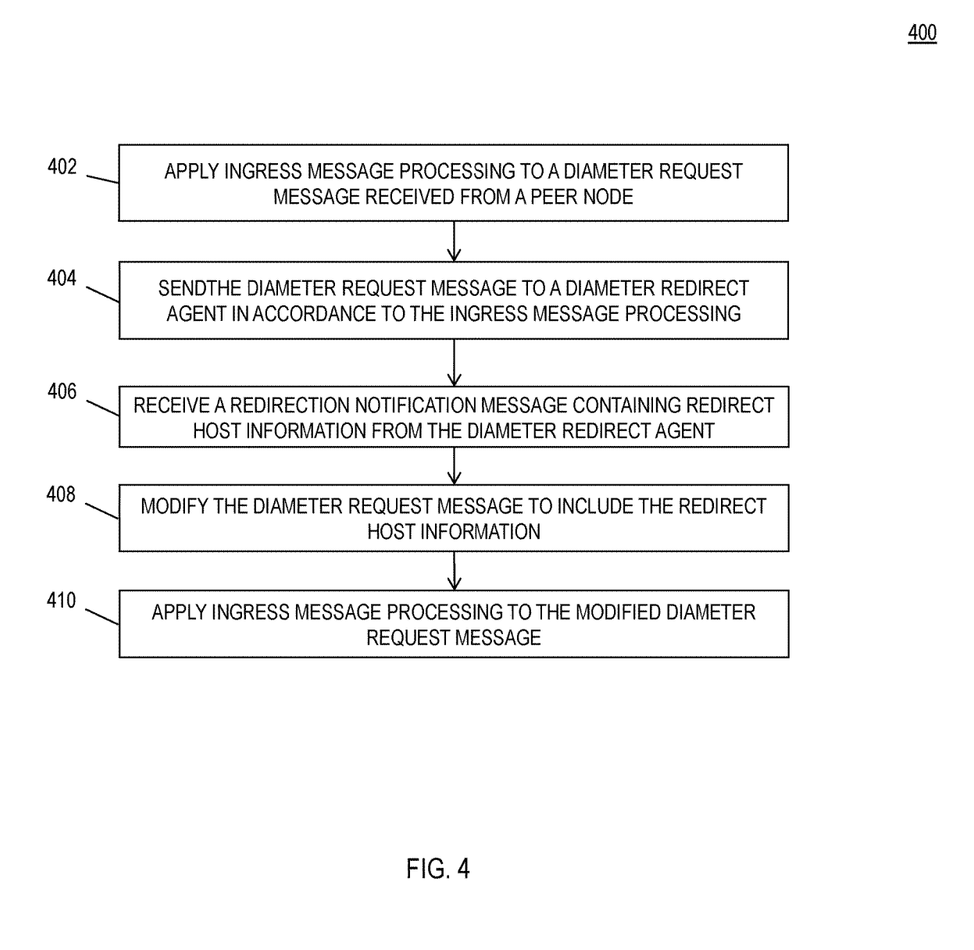
FIG. 4 is a flow chart illustrating an exemplary process for routing a redirected request message according to an aspect of the subject matter described herein.

FIG. 4 is a flow chart illustrating an exemplary method 400 for routing a redirected request message according to an aspect of the subject matter described herein. In some embodiments, method 400 or portions therein can include actions or operations performed by DSR 106, redirection manager 118, and/or other module(s) or node(s) (e.g., one or more servers or computers containing one or more processors and memory). For example, redirection manager 118 or a clustering algorithm implemented using at least one physical computer may perform method 400 or portions therein. For illustrative purposes and explanation, references to entities included in FIGS. 1-3 may be used below.

Referring to FIG. 4, in step 402, ingress message processing is applied to a Diameter request message received from a peer node. In some embodiments, a DSR may receive a ULR message from an MME. Similarly, a DSR may receive a location information request message from an S-CSCF. In both instances, the Diameter request message received by the DSR may include identification information associated with a mobile device (e.g., an IMSI associated with a roaming/visiting mobile device or the called party number associated with a recipient mobile device).

In step 404, the Diameter request message is sent to a Diameter redirect agent in accordance to the ingress message processing. In some embodiments, the processing DSR sends the Diameter request message to a redirect agent, such as an SLF or some other roaming steering solution (hosted by a network server). Upon receiving the Diameter request message, the redirect agent determines whether the mobile subscriber associated with the identifier included in the Diameter request message is supported locally by the redirect agent. If so, then the redirect agent forwards the requested information to the DSR. If not, then the redirect agent accesses a local host server to determine the network element (e.g., an HSS) that supports the mobile subscriber in a home network. In such a scenario, the redirect agent generates a redirection notification message that includes the redirection information (e.g., IP network address and/or location information).

In step 406, a redirection notification message containing redirection information is received from the Diameter redirect agent. In some embodiments, the DSR receives the redirection notification message sent by the SLF. Notably, the redirection notification message may include network address and/or location information corresponding to an HSS that supports the mobile subscriber. In some embodiments, the redirection manager identifies a received redirection notification message by identifying a particular identifier, code, or AVP included in the received redirection notification message.

In step 408, the Diameter request message is modified to include the redirection information (e.g., redirect host information). In some embodiments, the redirection manager in the DSR is able to utilize the identification information included in the redirected request message to modify/update the Diameter request message originally received from the peer node.

In step 410, ingress message processing is applied to the modified Diameter request message. In some embodiments, the redirection manager submits the modified Diameter request message by first extracting the identification information from the redirection notification message and subsequently forwarding the modified Diameter request message to the DAL of the DSR such that application processing may be applied to the modified Diameter request message containing the updated information received from the redirect agent.

The Diameter base protocol is described in IETF RFC 6733, October 2012. Realm based Redirection in Diameter is described in IETF RFC 7075, November 2013. The disclosure of each of these RFCs and standard documents is incorporated herein by reference in its entirety.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method comprising:
in a Diameter signaling routing (DSR) node including a plurality of message processors:
applying ingress message processing to a Diameter request message received from a peer node;
forwarding the Diameter request message to a Diameter redirect agent in accordance to the ingress message processing;
receiving, from the Diameter redirect agent, a redirection notification message containing redirection information;
modifying the Diameter request message to include the redirection information; and
applying ingress message processing to the modified Diameter request message within the DSR.

2. The method of claim 1 comprising using at least one of an application routing table (ART) and a peer routing table (PRT) to determine a destination for the modified Diameter request message based on the redirection information.

3. The method of claim 1 further comprises forwarding the modified Diameter request message to a second peer node that is identified by the ingress message processing applied to the modified Diameter request message.

4. The method of claim 1 wherein the ingress message processing applied to the modified Diameter request message is performed in lieu of directly forwarding the modified Diameter request message to a redirect host identified by the redirection notification.

5. The method of claim 1 wherein the redirection information includes at least one of redirect host location AVP information, redirect realm AVP information, redirect host usage information, and redirect host caching information.

6. The method of claim 1 wherein the received Diameter request message includes at least one of an update location request (ULR) message and a location information request (LIR) message.

7. The method of claim 1 wherein the ingress message processing includes at least one of range based address resolution (RBAR), full address based resolution (FABR), protocol mediation, and mobile subscriber authentication.

8. A system comprising:
a Diameter signaling router (DSR) including a plurality of message processors;
the message processors including at least a first message processor for receiving a Diameter request message, for applying ingress message processing to a Diameter request message received from a peer node, and for forwarding the Diameter request message to a Diameter redirect agent in accordance to the ingress message processing; and
a redirection manager for receiving, from the Diameter redirect agent, a redirection notification message containing redirection information, modifying the Diameter request message to include the redirection information, and for applying the ingress message processing to the modified Diameter request message within the DSR.

9. The system of claim 8 wherein the message processor is further configured to use at least one of an application routing table (ART) and a peer routing table (PRT) to determine a destination for the modified Diameter request message based on the redirection information.

10. The system of claim 8 wherein the message processor is further configured to forward the modified Diameter request message to a second peer node that is identified by the ingress message processing applied to the modified Diameter request message.

11. The system of claim 8 wherein the ingress message processing applied to the modified Diameter request message is performed in lieu of directly forwarding the modified Diameter request message to a redirect host identified by the redirection notification.

12. The system of claim 8 wherein the redirection information includes at least one of redirect host location AVP information, redirect realm AVP information, redirect host usage information, and redirect host caching information.

13. The system of claim 8 wherein the received Diameter request message includes at least one of an update location request (ULR) message and a location information request (LIR) message.

14. The system of claim 8 wherein the ingress message processing includes at least one of range based address resolution (RBAR), full address based resolution (FABR), protocol mediation, and mobile subscriber authentication.

15. A non-transitory computer readable medium having stored thereon executable instructions that when executed by a processor of a computer control the computer to perform steps comprising:
in a Diameter signaling router (DSR) including a plurality of message processors:
applying ingress message processing to a Diameter request message received from a peer node;
forwarding the Diameter request message to a Diameter redirect agent in accordance to the ingress message processing;
receiving, from the Diameter redirect agent, a redirection notification message containing redirection information;

modifying the Diameter request message to include the redirection information; and applying the ingress message processing to the modified Diameter request message within the DSR.

16. The computer readable medium of claim 15 comprising using at least one of an application routing table (ART) and a peer routing table (PRT) to determine a destination for the modified Diameter request message based on the redirection information.

17. The computer readable medium of claim 15 further comprises forwarding the modified Diameter request message to a second peer node that is identified by the ingress message processing applied to the modified Diameter request message.

18. The computer readable medium of claim 15 wherein the ingress message processing applied to the modified Diameter request message is performed in lieu of directly forwarding the modified Diameter request message to a redirect host identified by the redirection notification.

19. The computer readable medium of claim 15 wherein the redirection information includes at least one of redirect host location AVP information, redirect realm AVP information, redirect host usage information, and redirect host caching information.

20. The computer readable medium of claim 15 wherein the received Diameter request message includes at least one of an update location request (ULR) message and a location information request (LIR) message.

* * * * *

UNITED STATES PATENT AND TRADEMARK OFFICE
CERTIFICATE OF CORRECTION

PATENT NO. : 10,009,258 B2  
APPLICATION NO. : 15/084444  
DATED : June 26, 2018  
INVENTOR(S) : Mannaluru et al.

Page 1 of 1

It is certified that error appears in the above-identified patent and that said Letters Patent is hereby corrected as shown below:

In the Drawings

On sheet 2 of 4, in FIG. 2, under Reference Numeral 235, Line 1, delete "DIAMATER" and insert -- DIAMETER --, therefor.

On sheet 4 of 4, in FIG. 4, under Reference Numeral 404, Line 1, delete "SENDTHE" and insert -- SEND THE --, therefor.

In the Specification

In Column 5, Line 57, delete ""DiameterIdentity"" and insert -- "DiameterIdentity" --, therefor.

Signed and Sealed this  
Ninth Day of April, 2019

Andrei Iancu  
*Director of the United States Patent and Trademark Office*